Figures 1, 2:
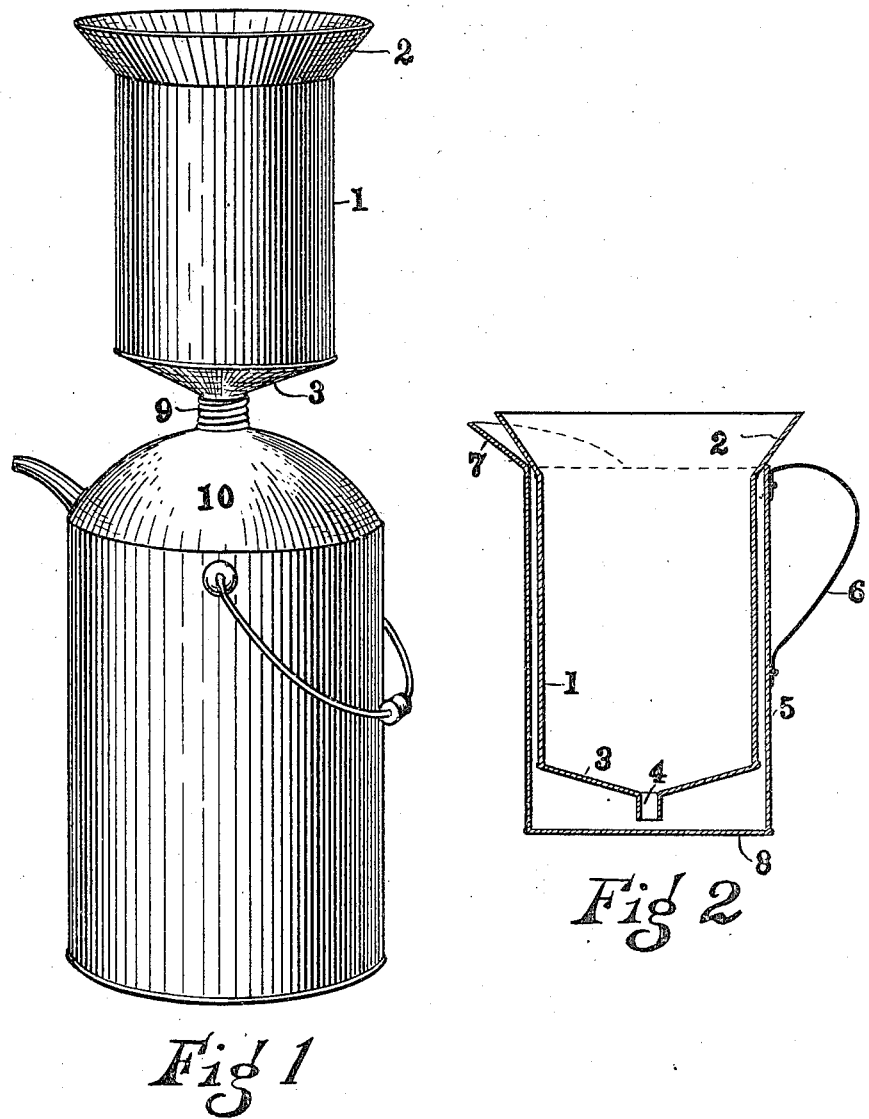

W. R. HICKOX.
COMBINED FUNNEL AND MEASURE.
APPLICATION FILED JUNE 16, 1909.

949,074.

Patented Feb. 15, 1910.

Witnesses
Glenara Fox
Kathryn Brunneman

INVENTOR-
William R. Hickox,
BY C. E. Humphrey
ATTORNEY

UNITED STATES PATENT OFFICE.

WILLIAM R. HICKOX, OF BARBERTON, OHIO.

COMBINED FUNNEL AND MEASURE.

949,074.  Specification of Letters Patent.  Patented Feb. 15, 1910.

Application filed June 16, 1909. Serial No. 502,621.

*To all whom it may concern:*

Be it known that I, WILLIAM R. HICKOX, a citizen of the United States, residing at Barberton, in the county of Summit and State of Ohio, have invented new and useful Improvements in Combined Funnels and Measures, of which the following is a specification.

This invention relates to a filling funnel and the object thereof is to provide a filling funnel adapted to be used in connection with a measuring vessel, the two being so constructed that the funnel when not in use may be nested in the vessel to occupy as little space as possible.

A further and important object of this invention is to make the funnel with a capacity equal to or greater than the vessel so that the entire contents of the latter may be emptied into the funnel and while the liquid is passing therefrom to a receptacle, the vessel may be refilled, thereby saving the extra time ordinarily required when the funnel is too small to contain the contents of the vessel and the outlet is so small that considerable time is required in emptying the contents of the vessel into the funnel.

Heretofore it has been customary to make a funnel of a conical form with a comparatively small outlet, usually having less capacity than the vessel in connection with which it is used and on account of the shape of the funnel it cannot be nested and the flow of liquid is impeded by its relatively small outlet, whereby considerable time is required in its use; but a funnel constructed in accordance with this invention may be placed upon a receptacle and the entire contents of the vessel emptied therein and while the liquid is escaping from the funnel into the receptacle, the refilling of the vessel may be accomplished, thus saving considerable time by the use of this invention.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claim hereunto appended.

In the drawings in which similar reference numerals indicate like parts in the different figures: Figure 1 is a perspective view of my improved funnel mounted on a receptacle for liquid; and, Fig. 2 is a vertical, central, longitudinal, sectional view of my improved funnel nested in a vessel.

Referring to the drawings in detail, the funnel consists preferably of a cylindrical portion 1 from which extends an upwardly-extending, inverted frusto-conically-formed flange 2. The bottom 3 of the funnel is preferably conically-formed terminating in an outlet 4 preferably made much larger than the funnels now in common use.

The funnel is adapted when not in use to be nested in a vessel preferably having a cylindrical body 5, a handle 6 and a pouring spout 7. The cylindrical body 5 of the vessel is preferably somewhat longer than the cylindrical portion 1 of the funnel so that when they are nested the flange 2 will rest on the upper edge of the vessel and support the funnel so that the outlet 4 will clear the bottom 8 of the former, thereby preventing damage to either.

In Fig. 1 the funnel is shown mounted on a can 10 inserted in the filling neck 9 thereof which is here used to illustrate the application of this invention. It will be obvious that by mounting the funnel in position as shown in Fig. 1 the entire contents of the vessel may be poured into the funnel and while it is escaping into the receptacle 10 the vessel may be refilled, the two operations taking place simultaneously, whereby a vast amount of time is saved by a person such as a grocer in retailing oil where it is ordinarily customary and necessary under the present practice to slowly pour the oil from the vessel into the funnel a little at a time to prevent overflowing, thus consuming considerable time which could otherwise be used for refilling the vessel.

What I claim and desire to secure by Letters Patent, is:—

A funnel comprising an approximately cylindrical body portion with an upwardly-extending conically-formed flange extending from the upper end thereof and having a conically-formed bottom terminating in a depending outlet adapted to convey the contents of said funnel to a receptacle, in combination with a filling vessel adapted to be used in connection therewith having a suitable conformation to permit the nesting of the funnel therein, with a capacity approximately equivalent to the capacity of said funnel, the flange of said funnel adapted to engage the upper end of said vessel when said funnel is nested therein to maintain the outlet of said funnel from contact with the bottom of said vessel.

In testimony whereof I have hereunto set my hand in presence of two subscribing witnesses.

WILLIAM R. HICKOX.

Witnesses:
C. E. HUMPHREY,
GLENARA FOX.